United States Patent
Punde et al.

(10) Patent No.: US 10,099,212 B2
(45) Date of Patent: Oct. 16, 2018

(54) HYDROCARBON STORAGE OPTIMIZATION AND COKING PREVENTION ON AN OXIDATION CATALYST

(71) Applicant: Cummins Emission Solutions Inc., Columbus, IN (US)

(72) Inventors: Shirish S. Punde, Columbus, IN (US); Arvind V. Harinath, Columbus, IN (US); Changsheng C. Su, Columbus, IN (US); Aravindh K. Kanakamedala, Columbus, IL (US)

(73) Assignee: Cummins Emission Solutions Inc., Columbus, IN (US)

( * ) Notice: Subject to any disclaimer, the term of this patent is extended or adjusted under 35 U.S.C. 154(b) by 0 days.

(21) Appl. No.: 15/458,415

(22) Filed: Mar. 14, 2017

(65) Prior Publication Data

US 2017/0266649 A1 Sep. 21, 2017

Related U.S. Application Data

(60) Provisional application No. 62/308,637, filed on Mar. 15, 2016.

(51) Int. Cl.
| | |
|---|---|
| *B01J 35/00* | (2006.01) |
| *B01D 53/94* | (2006.01) |
| *F01N 3/08* | (2006.01) |
| *F01N 3/10* | (2006.01) |

(52) U.S. Cl.
CPC ...... *B01J 35/0006* (2013.01); *B01D 53/9477* (2013.01); *F01N 3/0814* (2013.01); *F01N 3/0835* (2013.01); *F01N 3/103* (2013.01); *B01D 2255/904* (2013.01); *B01D 2255/912* (2013.01)

(58) Field of Classification Search
CPC .............. B01J 35/0006; B01J 35/0073; B01D 53/9477; B01D 2255/903; B01D 2255/9032; B01D 2255/912
USPC ...... 502/100, 439; 428/116, 593; 423/213.2, 423/239.1
See application file for complete search history.

(56) References Cited

U.S. PATENT DOCUMENTS

| | | | | |
|---|---|---|---|---|
| 3,331,787 | A * | 7/1967 | Bair | B01D 53/944 502/223 |
| 5,043,311 | A * | 8/1991 | Engler | B01D 53/945 423/213.5 |
| 6,710,014 | B2 * | 3/2004 | Domesle | B01J 35/04 29/890 |
| 7,119,044 | B2 * | 10/2006 | Wei | B01D 53/9431 502/300 |

(Continued)

FOREIGN PATENT DOCUMENTS

| | | | | |
|---|---|---|---|---|
| JP | 61-025644 | * | 2/1986 | B01J 35/10 |
| JP | 63-084635 | * | 4/1988 | B01J 23/44 |

*Primary Examiner* — Patricia L. Hailey
(74) *Attorney, Agent, or Firm* — Foley & Lardner LLP

(57) ABSTRACT

An oxidation catalyst may include hydrocarbon storage material. One implementation relates to a diesel oxidation catalyst that includes a catalyst having a front zone and a rear zone and a gradient of hydrocarbon storage material on the catalyst extending from the front zone to the rear zone. The gradient of hydrocarbon storage material, may comprise a linear gradient, a step gradient, a parabolic gradient, a logarithmic gradient, or other forms thereof.

20 Claims, 5 Drawing Sheets

(56) References Cited

U.S. PATENT DOCUMENTS

| | | | | |
|---|---|---|---|---|
| 7,465,690 B2* | 12/2008 | Yan | .................... | B01D 53/944 |
| | | | | 422/177 |
| 7,906,454 B2* | 3/2011 | Wolf | .................... | B01D 53/945 |
| | | | | 422/177 |
| 9,545,602 B2* | 1/2017 | Sonntag | ................ | B01J 35/0006 |
| 9,737,852 B2* | 8/2017 | Massner | ............... | B01J 35/0006 |
| 9,764,310 B2* | 9/2017 | Markatou | ................. | B01J 23/44 |
| 2007/0028604 A1* | 2/2007 | Twigg | ................. | B01D 53/9472 |
| | | | | 60/297 |
| 2009/0217652 A1* | 9/2009 | Bergeal | ................ | B01D 53/945 |
| | | | | 60/299 |
| 2009/0288402 A1* | 11/2009 | Voss | ................... | B01D 53/9418 |
| | | | | 60/299 |
| 2010/0167920 A1* | 7/2010 | Uemura | ............... | B01D 53/945 |
| | | | | 502/327 |
| 2010/0183490 A1* | 7/2010 | Hoke | ................... | B01D 53/945 |
| | | | | 423/213.5 |
| 2010/0184589 A1* | 7/2010 | Miyairi | .............. | B01D 46/2425 |
| | | | | 502/172 |
| 2011/0123421 A1* | 5/2011 | Grubert | ................ | B01D 53/944 |
| | | | | 423/212 |
| 2011/0268624 A1* | 11/2011 | Chandler | ........... | A44B 13/0011 |
| | | | | 422/222 |
| 2011/0286900 A1* | 11/2011 | Caudle | ............... | B01D 53/9436 |
| | | | | 423/213.5 |
| 2014/0271429 A1* | 9/2014 | Kazi | ........................ | B01J 23/44 |
| | | | | 423/213.5 |
| 2016/0367941 A1* | 12/2016 | Gilbert | ............... | B01D 53/9468 |

* cited by examiner

HYDROCARBON STORAGE OPTIMIZATION AND COKING PREVENTION ON AN OXIDATION CATALYST

CROSS-REFERENCE TO RELATED APPLICATIONS

The present application claims priority to U.S. provisional patent application No. 62/308,637, filed Mar. 15, 2016 and the contents of which are incorporated herein by reference.

TECHNICAL FIELD

The present application relates generally to the field of aftertreatment systems for internal combustion engines.

BACKGROUND

For internal combustion engines, such as diesel engines, nitrogen oxide ($NO_x$) compounds may be emitted in the exhaust. To reduce $NO_x$ emissions, a selective catalytic reduction (SCR) process may be implemented to convert the $NO_x$ compounds into more neutral compounds, such as diatomic nitrogen, water, or carbon dioxide, with the aid of a catalyst and a reductant. The catalyst may be included in a catalyst reaction tube of an exhaust system, such as that of a vehicle or power generation unit. A reductant such as anhydrous ammonia, aqueous ammonia, or urea is typically introduced into the exhaust gas flow prior to the catalyst reaction tube. To introduce the reductant into the exhaust gas flow for the SCR process, an SCR system may dose or otherwise introduce the reductant through a doser that vaporizes or sprays the reductant into an exhaust pipe of the exhaust system upstream of the catalyst reaction tube. The SCR system may include one or more sensors to monitor conditions within the exhaust system.

SUMMARY

Implementations described herein relate to oxidation catalysts, and particularly diesel oxidation catalysts, having hydrocarbon storage material.

One implementation relates to an oxidation catalyst that includes a catalyst having a front zone and a rear zone and a gradient of hydrocarbon storage material on the catalyst extending from the front zone to the rear zone.

In some implementations, the gradient of hydrocarbon storage material is a linear gradient, a step gradient, a parabolic gradient, or a logarithmic gradient. In some implementations, the front zone of the catalyst includes a buffer zone with no hydrocarbon storage material.

Another implementation involves a method comprising applying a catalyst material to a surface of a catalyst substrate of an oxidation catalyst. The method further comprises applying a hydrocarbon storage material to the surface of the catalyst substrate, the hydrocarbon storage material applied in a first amount on a front zone of the oxidation catalyst proximate an inlet of the oxidation catalyst and a second amount on a rear zone of the oxidation catalyst distal from the inlet, the first amount being less than the second amount.

BRIEF DESCRIPTION OF THE DRAWINGS

The details of one or more implementations are set forth in the accompanying drawings and the description below.

Other features, aspects, and advantages of the disclosure will become apparent from the description, the drawings, and the claims, in which:

FIG. 6(*b*) a representation of a portion of a DOC, where a hydrocarbon storage material is loaded in a gradient from the front zone to the rear zone, and where the front zone includes a buffer zone.

Figure 1:
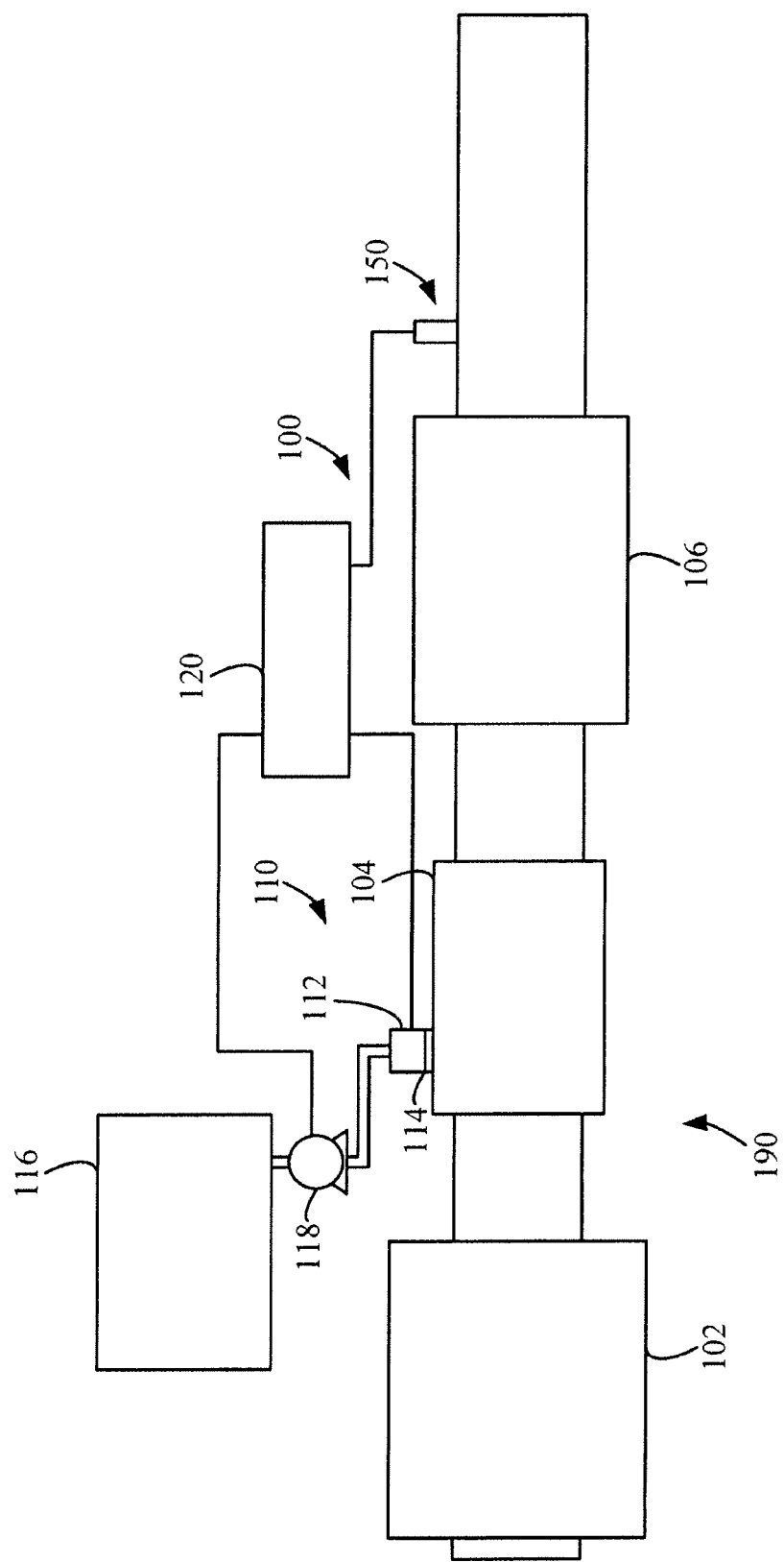
FIG. 1 is a block schematic diagram of an example selective catalytic reduction system having an example reductant delivery system for an exhaust system.

It will be recognized that some or all of the figures are schematic representations for purposes of illustration. The figures are provided for the purpose of illustrating one or more implementations with the explicit understanding that they will not be used to limit the scope or the meaning of the claims.

DETAILED DESCRIPTION

Following below are more detailed descriptions of various concepts related to, and implementations of, methods, apparatuses, and systems for structuring hydrocarbon storage material for a diesel oxidation catalyst to reduce coking. The various concepts introduced above and discussed in greater detail below may be implemented in any of numerous ways, as the described concepts are not limited to any particular manner of implementation. Examples of specific implementations and applications are provided primarily for illustrative purposes.

I. Overview

A hydrocarbon (HC) storage component may be utilized on an oxidation catalyst, particularly a diesel oxidation catalyst (DOC), to meet a tailpipe hydrocarbon target, such as a regulation requirement. When the temperature of exhaust gases is lower than a lightoff temperature of the DOC (e.g., approximately 200° C.), the hydrocarbons from engine may not be oxidized by the DOC. However, to meet the tailpipe hydrocarbon target, the DOC may include a hydrocarbon storage material that can store the hydrocarbons at temperatures below the lightoff temperature of the DOC. Typically the hydrocarbon storage material is present either in the front zone of the catalyst of the DOC (i.e., proximate the inlet) or along the entire catalyst length of the DOC. The stored hydrocarbon is released from the hydrocarbon storage material when the temperature is close to the lightoff temperature on the DOC (e.g., at approximately 170-180° C. based on the selected hydrocarbon storage material). Due to this design, the released hydrocarbons are then oxidized by the DOC as the temperature of the DOC rises to and above the lightoff temperature.

However, when the hydrocarbon storage material is present at the front zone of the catalyst of the DOC, the change in the DOC inlet temperature can release a significant amount of hydrocarbon material due to the adsorption equilibrium and, if the amount of oxygen present is not sufficient to oxidize the released hydrocarbons (e.g., operating in a rich mode), then there is a possibility of forming coking on the active sites of the catalyst of the DOC. This coking can lead to performance degradation of the DOC due to blockage of channels in the DOC, reduction of hydrocarbon storage, and/or blockage of the active sites of the catalyst of the DOC for hydrocarbon oxidation.

Accordingly, systems and methods described herein serve to reduce the formation of coking in the front zone of the catalyst of the DOC while still sufficiently absorbing and releasing hydrocarbons in the catalyst of the DOC to be oxidized when the DOC approaches and exceeds the lightoff temperature.

II. Overview of Aftertreatment System

FIG. 1 depicts an aftertreatment system 100 having an example reductant delivery system 110 for an exhaust system 190. The aftertreatment system 100 includes a diesel particulate filter (DPF) 102, the reductant delivery system 110, a decomposition reaction tube or reactor 104, a SCR catalyst 106, and a sensor 150.

The DPF 102 is configured to remove particulate matter, such as soot, from exhaust gas flowing in the exhaust system 190. The DPF 102 includes an inlet, where the exhaust gas is received, and an outlet, where the exhaust gas exits after having particulate matter substantially filtered from the exhaust gas and/or converting the particulate matter into carbon dioxide.

The decomposition reaction tube 104 is configured to convert a reductant, such as urea, aqueous ammonia, or diesel exhaust fluid (DEF), into ammonia. It should be noted that, while element 104 is referred to as a decomposition reaction tube herein, the structure used to convert the reductant can take the form of another type of decomposition reaction member or structure as well, such as a chamber. The term "decomposition reaction tube" should therefore be interpreted broadly herein. The decomposition reaction tube 104 includes a reductant delivery system 110 having a doser 112 configured to dose the reductant into the decomposition reaction tube 104. In some implementations, the reductant is injected or otherwise inserted upstream of the SCR catalyst 106. The reductant droplets then undergo the processes of evaporation, thermolysis, and hydrolysis to form gaseous ammonia within the exhaust system 190. The decomposition reaction tube 104 includes an inlet in fluid communication with the DPF 102 to receive the exhaust gas containing $NO_x$ emissions and an outlet for the exhaust gas, $NO_x$ emissions, ammonia, and/or remaining reductant to flow to the SCR catalyst 106.

The decomposition reaction tube 104 includes the doser 112 mounted to the decomposition reaction tube 104 such that the doser 112 may dose the reductant into the exhaust gases flowing in the exhaust system 190. The doser 112 may include an insulator 114 interposed between a portion of the doser 112 and the portion of the decomposition reaction tube 104 to which the doser 112 is mounted. The doser 112 is fluidly coupled to one or more reductant sources 116. In some implementations, a pump 118 may be used to pressurize the reductant from the reductant source 116 for delivery to the doser 112.

The doser 112 and pump 118 are also electrically or communicatively coupled to a controller 120. The controller 120 is configured to control the doser 112 to dose reductant into the decomposition reaction tube 104. The controller 120 may also be configured to control the pump 118. The controller 120 may include a microprocessor, an application-specific integrated circuit (ASIC), a field-programmable gate array (FPGA), etc., or combinations thereof. The controller 120 may include memory which may include, but is not limited to, electronic, optical, magnetic, or any other storage or transmission device capable of providing a processor, ASIC, FPGA, etc. with program instructions. The memory may include a memory chip, Electrically Erasable Programmable Read-Only Memory (EEPROM), erasable programmable read only memory (EPROM), flash memory, or any other suitable memory from which the controller 120 can read instructions. The instructions may include code from any suitable programming language.

The SCR catalyst 106 is configured to assist in the reduction of $NO_x$ emissions by accelerating a $NO_x$ reduction process between the ammonia and the $NO_x$ of the exhaust gas into diatomic nitrogen, water, and/or carbon dioxide. The SCR catalyst 106 includes inlet in fluid communication with the decomposition reaction tube 104 from which exhaust gas and reductant is received and an outlet in fluid communication with an end of the exhaust system 190.

The exhaust system 190 may further include an oxidation catalyst, such as a DOC, in fluid communication with the exhaust system 190 (e.g., downstream of the SCR catalyst 106 or upstream of the DPF 102) to oxidize hydrocarbons and carbon monoxide in the exhaust gas.

In some implementations, the DPF 102 may be positioned downstream of the decomposition reaction tube or reactor pipe 104. For instance, the DPF 102 and the SCR catalyst 106 may be combined into a single unit, such as a SCR on diesel particulate filter (SDPF). In some implementations, the doser 112 may instead be positioned downstream of a turbocharger or upstream of a turbocharger.

The sensor 150 may be coupled to the exhaust system 190 to detect a condition of the exhaust gas flowing through the exhaust system 190. In some implementations, the sensor 150 may have a portion disposed within the exhaust system 190, such as a tip of the sensor 150 may extend into a portion of the exhaust system 190. In other implementations, the sensor 150 may receive exhaust gas through another conduit. For example, a sample pipe may extend from the exhaust system 190. While the sensor 150 is depicted as positioned downstream of the SCR catalyst 106, it should be understood that the sensor 150 may be positioned at any other position of the exhaust system 190, including upstream of the DPF 102, within the DPF 102, between the DPF 102 and the decomposition reaction tube 104, within the decomposition reaction tube 104, between the decomposition reaction tube 104 and the SCR catalyst 106, within the SCR catalyst 106, or downstream of the SCR catalyst 106. In addition, two or more sensors 150 may be utilized for detecting a condition of the exhaust gas, such as two, three, four, five, or six sensors 150 with each sensor 150 located at one of the foregoing positions of the exhaust system 190.

As noted above, when the hydrocarbon storage material is present at a front zone of a catalyst of the DOC, a change in the DOC inlet temperature can release a significant amount of hydrocarbon material due to the adsorption equilibrium and, if the amount of oxygen present is not sufficient to oxidize the released hydrocarbons (e.g., operating in a rich mode), then there is a possibility of forming coking on the active sites of the catalyst of the DOC. As used herein, the term "catalyst" (separate from the DOC) refers to the catalyst substrate with catalyst material coated or dispersed therein. Coking on the active sites of the catalyst can lead to performance degradation of the DOC due to blockage of channels in the DOC, reduction of hydrocarbon storage, and/or blockage of the active sites of the catalyst of the DOC for hydrocarbon oxidation.

Figure 2:
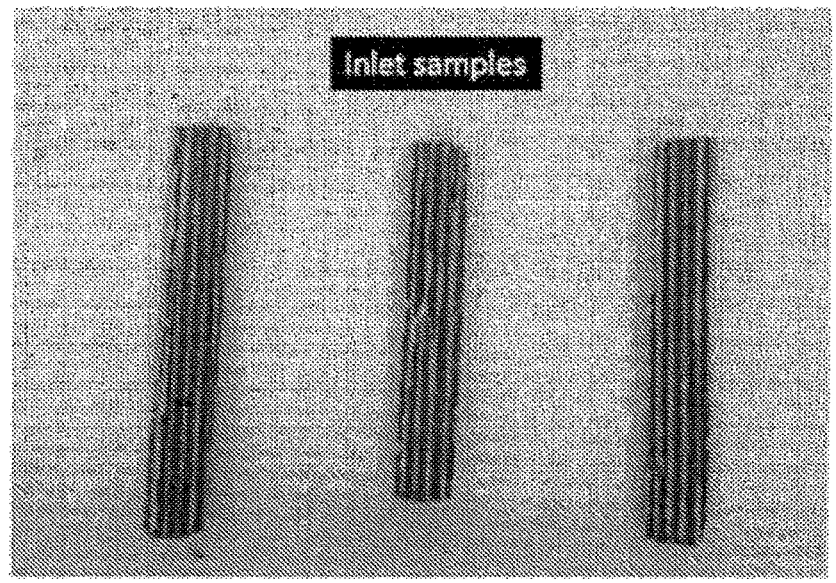
FIG. 2 is a depiction of inlet core samples from a diesel oxidation catalyst.
Figure 3:
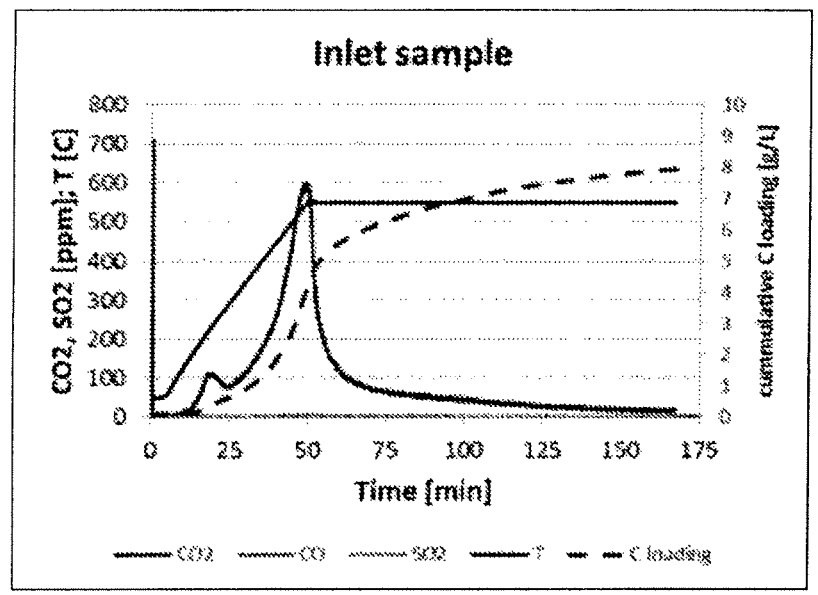
FIG. 3 is a graph of temperature, $CO_2$ emissions, $SO_2$ emissions, CO emissions, and calculated carbon loading over time for the inlet core samples.

FIG. 2 depicts inlet core samples from a diesel oxidation catalyst having a constant hydrocarbon absorbing material and that depict darkened material due to coking on the core samples. FIG. 3 is a graph of temperature, $CO_2$ emissions, $SO_2$ emissions, CO emissions, and calculated carbon loading over time for the inlet core samples based on a temperature program oxidation analysis. FIG. 3 depicts a temperature increase from 0° C. to 550° C. from 0 minutes to 50 minutes in a linear manner and a constant temperature at 550° C. from 50 minutes to 175 minutes. During this time, the measured $CO_2$ emissions had a small peak at approximately 100 ppm of $CO_2$ at a temperature of approximately 200° C. indicative of the start of hydrocarbon release from the hydrocarbon storage material and hydrocarbon oxidation by the catalyst of the DOC. The measured $CO_2$ emissions decrease, reach a minimum, and moderately increase during the temperature period from approximately 200° C. to approximately 400° C., indicative of hydrocarbon release from the hydrocarbon storage material and hydrocarbon oxidation by the catalyst of the DOC while sufficient oxygen is present for hydrocarbon oxidation. The measured $CO_2$ emissions increase significantly to 600 ppm of $CO_2$ at from a temperature of approximately 400° C. to 550° C. indicative of coking formation due to insufficient oxygen for hydrocarbon oxidation. The carbon loading is calculated based on the measured $CO_2$ emissions to provide an indication of the amount of coking or cumulative carbon loading on the catalyst in grams per liter (g/L).

Figure 4:
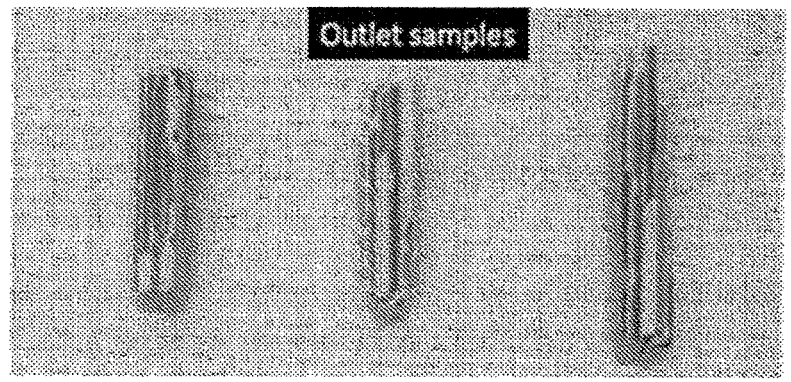
FIG. 4 is a depiction of outlet core samples from a diesel oxidation catalyst.
Figure 5:
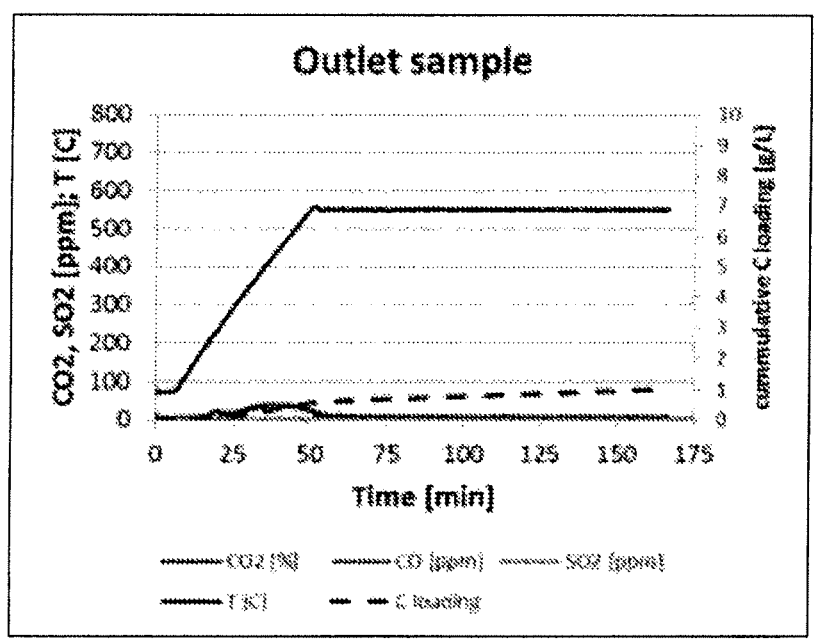
FIG. 5 is a graph of temperature, $CO_2$ emissions, $SO_2$ emissions, CO emissions, and calculated carbon loading over time for the inlet core samples.

FIG. 4 depicts outlet core samples from a diesel oxidation catalyst having a constant hydrocarbon absorbing material and that depict normal material with minimal or no coking on the core samples. FIG. 5 is a graph of temperature, $CO_2$ emissions, $SO_2$ emissions, CO emissions, and calculated carbon loading over time for the outlet core samples based on a temperature program oxidation analysis. FIG. 5 depicts a temperature increase from 0° C. to 550° C. from 0 minutes to 50 minutes in a linear manner and a constant temperature at 550° C. from 50 minutes to 175 minutes. During this time, the measured $CO_2$ emissions minimally rises at approximately 50 ppm of $CO_2$ at a temperature of approximately 400° C. indicative of minimal coking formation due to insufficient oxygen for hydrocarbon oxidation. The carbon loading is calculated based on the measured $CO_2$ emissions to provide an indication of the amount of coking or cumulative carbon loading on the catalyst in grams per liter (g/L).

Thus, the inlet core samples of FIG. 2 demonstrate that the front zone of the catalyst experiences increased coking due to a large release of hydrocarbon material as the front of the DOC increases in temperature while insufficient oxygen is present for hydrocarbon oxidation to occur. The front zone experiences temperature changes leading to a sudden release of hydrocarbon material which, in the absence of sufficient oxygen, may lead to coke formation. The outlet core samples of FIG. 4 demonstrate that the rear zone of the catalyst (distal from the inlet) experiences minimal coking due to a lower and/or slower release of hydrocarbon material as the rear of the DOC increases in temperature while sufficient oxygen is present for hydrocarbon oxidation to occur. The rear zone, although having the same amount of hydrocarbon storage material as the front zone, did not experience the sudden temperature changes and the oxygen levels were sufficient to avoid coke formation.

Accordingly, to reduce the formation of coking in the front zone of the catalyst of the DOC while still sufficiently absorbing and releasing hydrocarbons in the catalyst of the DOC to be oxidized when the DOC approaches and exceeds the lightoff temperature, the DOC can be designed to include a greater amount of hydrocarbon storage material (e.g., zeolite) in the rear zone of the catalyst and a lesser amount of hydrocarbon storage material in the front zone of the catalyst. In some implementations, a maximum amount of hydrocarbon storage material may be incorporated at the rear zone of the catalyst and a minimum amount of hydrocarbon storage material may be incorporated at the front zone of the catalyst. Since the DOC thermal mass enables a gradual temperature rise in the rear zone of the DOC, a greater amount of hydrocarbon storage material can be incorporated in the rear zone without resulting in significant coking. In addition, since the rear zone heats up later, the rear zone hydrocarbon storage material can store hydrocarbon material until the front zone reaches the lightoff temperature. Moreover, the rear zone of the catalyst of the DOC can achieve higher temperatures than the front zone (e.g., temperatures of approximately 550° C. to approximately 650° C.), which can assist in the reduction and/or elimination of coke from the rear zone. In some instances, the rear zone of the DOC may have an exhaust gas temperature of approximately 550° C. prior to a diesel particulate filter of the aftertreatment system. The front zone of the catalyst of the DOC experiences sudden changes in temperatures, and there should thus be a reduced or minimal amount of hydrocarbon storage in the front zone to avoid coking.

Figure 6A:
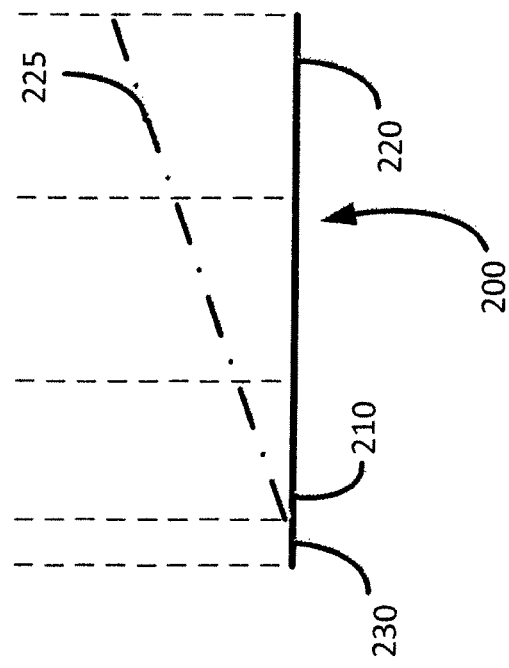
FIG. 6(*a*) a representation of a portion of a DOC, where a hydrocarbon storage material is loaded in a gradient from the front zone to the rear zone.

In some implementations, the hydrocarbon storage material may be loaded on the catalyst of the DOC in a gradient from the front zone to the rear zone. FIG. 6(a) is a graphical representation of such implementations. FIG. 6(a) shows a portion of a DOC 200 including a front zone 210 and a rear zone 220. The gradient of hydrocarbon storage material is generally represented by 225. The gradient 225 may be a linear gradient, a step gradient, a parabolic or exponential gradient, a logarithmic gradient, etc. In some implementations, the gradient 225 for the hydrocarbon storage material may be such that the amount of hydrocarbon material stored is from 0 g/L of at the front zone to 4 g/L at the rear zone (e.g., a linear gradient of hydrocarbon storage material along the length of the catalyst to store from 0 g/L to 4 g/L hydrocarbon material, a step gradient of hydrocarbon storage material along the length of the catalyst to store from 0 g/L to 4 g/L of hydrocarbon material, a parabolic or exponential gradient of hydrocarbon storage material along the length of the catalyst to store from 0 g/L to 4 g/L of hydrocarbon material, a logarithmic gradient of hydrocarbon storage material along the length of the catalyst to store from 0 g/L to 4 g/L of hydrocarbon material, etc.).

Other gradients for the hydrocarbon storage material for the catalyst of the DOC in any of the linear, step, parabolic or exponential, logarithmic, etc. gradients may be such that the amount of hydrocarbon material stored is in a range of 0 g/L of hydrocarbon storage, inclusive, to 4 g/L of hydrocarbon storage, inclusive, in the front zone. The gradients may be such that the amount of hydrocarbon material stored is in a range of 0 g/L of hydrocarbon storage, inclusive, to 8 g/L of hydrocarbon storage, inclusive, in the front zone. The gradients may be such that the amount of hydrocarbon material stored is in a range of 4 g/L of hydrocarbon storage, inclusive, to 8 g/L of hydrocarbon storage, inclusive, in the rear zone. The gradients may be such that the amount of hydrocarbon material stored is in a range of 0 g/L of hydrocarbon storage, inclusive, to 8 g/L of hydrocarbon storage, inclusive, in the rear zone. Still other ranges of hydrocarbon material that is stored in the front zone and/or rear zone may be used.

In some implementations, the gradient for the hydrocarbon storage material may be from 0 g/L of hydrocarbon storage at the front zone to 6 g/L of hydrocarbon storage at the rear zone. In other implementations, the gradient for the hydrocarbon storage may be from 0 g/L of hydrocarbon storage at the front zone to 8 g/L of hydrocarbon storage at the rear zone. The gradient for the hydrocarbon storage material may be from 2 g/L of hydrocarbon storage at the front zone to 8 g/L of hydrocarbon storage at the rear zone. The gradient for the hydrocarbon storage material may be from 2 g/L of hydrocarbon storage at the front zone to 6 g/L of hydrocarbon storage at the rear zone. The gradient for the hydrocarbon storage material may be from 2 g/L of hydrocarbon storage at the front zone to 4 g/L of hydrocarbon storage at the rear zone.

Figure 6B:
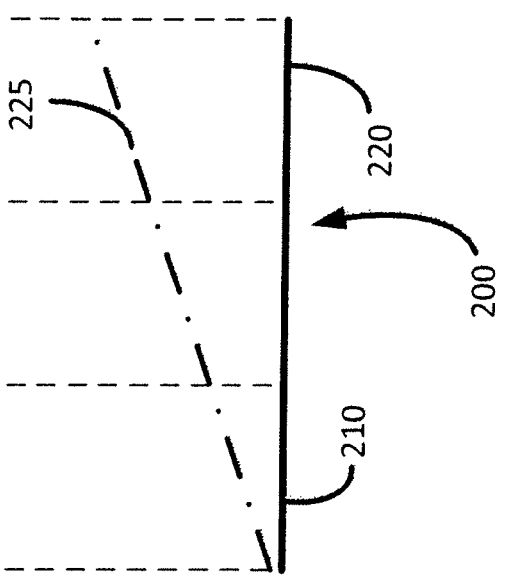

In some implementations, a buffer zone 230 (represented in FIG. 6(b)) where no hydrocarbon storage material is applied to the catalyst of the DOC 200 may be implemented such that the front zone 210 of the DOC 200 may increase in temperature to and/or above the lightoff temperature of the DOC with minimal hydrocarbon material release.

Figure 7:
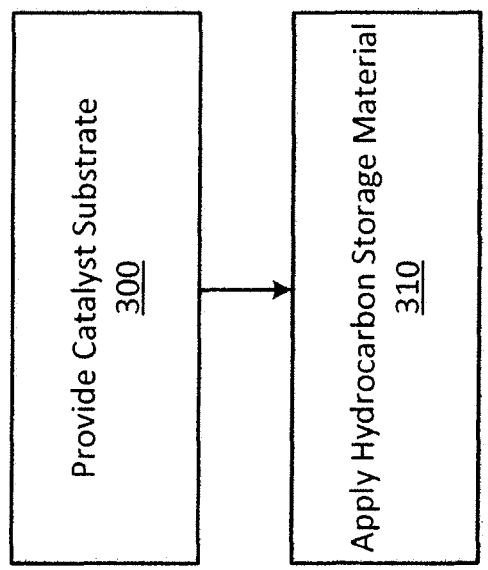
FIG. 7 is a flow chart showing a method of manufacturing an oxidation catalyst according to an example embodiment.

FIG. 7 is a flow chart showing a method of manufacturing an oxidation catalyst according to an example embodiment. At 300, a catalyst substrate is provided. At 310, a hydrocarbon storage material is applied (e.g., coated or otherwise dispersed) to the surface of the catalyst substrate. It should be understood that, where a catalyst material is also dispersed or otherwise applied to the catalyst substrate, the application of the catalyst material can occur before or after the application of the hydrocarbon storage material, and the application of the two materials could occur substantially simultaneously. The hydrocarbon storage material is applied so as to form a gradient in any of the forms disclosed herein.

While this specification contains many specific implementation details, these should not be construed as limitations on the scope of what may be claimed, but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

As utilized herein, the terms "approximately," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims. Additionally, it is noted that limitations in the claims should not be interpreted as constituting "means plus function" limitations under the United States patent laws in the event that the term "means" is not used therein.

The terms "coupled" and the like as used herein mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another or with the two components or the two components and any additional intermediate components being attached to one another.

The terms "fluidly coupled," "in fluid communication," and the like as used herein mean the two components or objects have a pathway formed between the two components or objects in which a fluid, such as water, air, gaseous reductant, gaseous ammonia, etc., may flow, either with or without intervening components or objects. Examples of fluid couplings or configurations for enabling fluid communication may include piping, channels, or any other suitable components for enabling the flow of a fluid from one component or object to another.

It is important to note that the construction and arrangement of the system shown in the various exemplary implementations is illustrative only and not restrictive in character. All changes and modifications that come within the spirit and/or scope of the described implementations are desired to be protected. It should be understood that some features may not be necessary and implementations lacking the various features may be contemplated as within the scope of the application, the scope being defined by the claims that follow. In reading the claims, it is intended that when words such as "a," "an," "at least one," or "at least one portion" are used there is no intention to limit the claim to only one item unless specifically stated to the contrary in the claim. When the language "a portion" is used the item can include a portion and/or the entire item unless specifically stated to the contrary.

What is claimed is:

1. An oxidation catalyst unit comprising:
   a catalyst comprising a catalyst substrate and a catalyst material disposed on the catalyst substrate, the catalyst having a front zone and a rear zone; and
   a gradient of hydrocarbon storage material on the catalyst extending from the front zone to the rear zone.

2. The oxidation catalyst unit of claim 1, wherein the gradient of hydrocarbon storage material is a linear gradient.

3. The oxidation catalyst unit of claim 1, wherein the gradient of hydrocarbon storage material is a step gradient.

4. The oxidation catalyst unit of claim 1, wherein the gradient of hydrocarbon storage material is a parabolic gradient.

5. The oxidation catalyst unit of claim 1, wherein the gradient of hydrocarbon storage material is a logarithmic gradient.

6. The oxidation catalyst unit of claim 1, wherein the gradient of the hydrocarbon storage material is such that an amount of hydrocarbon material stored is from 0 grams per liter, inclusive, to 4 grams per liter, inclusive, at the front zone.

7. The oxidation catalyst unit of claim 1, wherein the gradient of the hydrocarbon storage material is such that an amount of hydrocarbon material stored is from 4 grams per liter, inclusive, to 8 grams per liter, inclusive, at the rear zone.

8. The oxidation catalyst of claim 1, wherein the front zone of the catalyst includes a buffer zone with no hydrocarbon storage material.

9. A method, comprising:
applying a hydrocarbon storage material to a surface of a catalyst substrate having a catalyst material disposed on the catalyst substrate, the hydrocarbon storage material applied in a first amount on a front zone of the catalyst proximate an inlet of the catalyst and a second amount on a rear zone of the catalyst distal from the inlet, the first amount being less than the second amount.

10. The method of claim 9, wherein the hydrocarbon storage material is applied in a gradient extending from the front zone to the rear zone.

11. The method of claim 10, wherein the gradient of hydrocarbon storage material is a linear gradient.

12. The method of claim 10, wherein the gradient of hydrocarbon storage material is a step gradient.

13. The method of claim 10, wherein the gradient of hydrocarbon storage material is a parabolic gradient.

14. The method of claim 10, wherein the gradient of hydrocarbon storage material is a logarithmic gradient.

15. The method of claim 10, wherein the hydrocarbon storage material is applied such that the gradient of the hydrocarbon storage material is from 0 grams per liter, inclusive, to 4 grams per liter, inclusive, of hydrocarbon storage.

16. The method of claim 10, wherein the hydrocarbon storage material is applied such that an amount of hydrocarbon material stored is from 2 grams per liter, inclusive, at the front zone to 6 grams per liter, inclusive, at the rear zone.

17. The method of claim 10, wherein the hydrocarbon storage material is applied such that an amount of hydrocarbon material stored is from 2 grams per liter, inclusive, at the front zone to 8 grams per liter, inclusive, at the rear zone.

18. The method of claim 9, wherein none of the hydrocarbon storage material is applied in a buffer zone of the front zone of the oxidation catalyst.

19. An oxidation catalyst comprising:
a catalyst having a front zone and a rear zone; and
a gradient of hydrocarbon storage material on the catalyst extending from the front zone to the rear zone, wherein the front zone of the catalyst includes a buffer zone with no hydrocarbon storage material.

20. A method, comprising:
applying a hydrocarbon storage material to a surface of a catalyst substrate, the hydrocarbon storage material applied in a first amount on a front zone of the catalyst proximate an inlet of the catalyst and a second amount on a rear zone of the catalyst distal from the inlet, the first amount being less than the second amount, wherein none of the hydrocarbon storage material is applied in a buffer zone of the front zone of the catalyst.

* * * * *